(12) United States Patent
Lin

(10) Patent No.: US 12,470,109 B2
(45) Date of Patent: Nov. 11, 2025

(54) MOTOR CONTROL METHOD FOR POWER TOOLS

(71) Applicant: Infineon Technologies Austria AG, Villach (AT)

(72) Inventor: Song Lin, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 278 days.

(21) Appl. No.: 18/143,669

(22) Filed: May 5, 2023

(65) Prior Publication Data
US 2024/0372437 A1 Nov. 7, 2024

(51) Int. Cl.
*H02K 7/14* (2006.01)
*B25F 5/00* (2006.01)
*H02K 11/33* (2016.01)

(52) U.S. Cl.
CPC ............. *H02K 7/145* (2013.01); *B25F 5/00* (2013.01); *H02K 11/33* (2016.01)

(58) Field of Classification Search
CPC ............ H02K 7/145; H02K 11/33; B25F 5/00
USPC ............................................. 310/50
See application file for complete search history.

(56) References Cited

U.S. PATENT DOCUMENTS

2024/0261956 A1 * 8/2024 Obermann ................ B25F 5/02

FOREIGN PATENT DOCUMENTS

| EP | 1788698 A1 * | 5/2007 | .......... B60L 11/1803 |
| GB | 2514790 A * | 12/2014 | ............... B60K 6/48 |
| KR | 2020010624 A * | 1/2020 | ............. G06F 16/35 |

* cited by examiner

*Primary Examiner* — Jose A Gonzalez Quinones
(74) *Attorney, Agent, or Firm* — Murphy, Bilak & Homiller, PLLC

(57) ABSTRACT

A method of controlling a motor of a power tool includes driving the motor such that the motor rotates in a first direction and in response to the power tool entering a stall condition, operating the motor in a first stall state for a predetermined duration or a predetermined number of motor rotation cycles. In the first stall state, either the motor is driven such that the motor rotates in a second direction opposite the first direction or the motor is allowed to reverse direction and freely rotate in the second direction without excitation via a gear box coupled to the motor. The method further includes, upon expiration of the predetermined duration or the predetermined number of motor rotation cycles, operating the motor in a second stall state which includes braking the motor. Also described herein is electronic circuitry for a motor of a power tool.

24 Claims, 10 Drawing Sheets

MOTOR CONTROL METHOD FOR POWER TOOLS

BACKGROUND

Stall torque in motor applications is the maximum torque that can be applied to the rotor and which causes the motor to stop rotating, i.e., to cause stalling. A motor in a stalled condition may be prone to overheating and possible damage if the current flowing under these conditions becomes higher than the maximum continuous rating. The stall torque performance of a power tool such as a power drill is related to the highest speed a motor can reach before reaching the stall position.

Existing motor control methods for power tools include a Hall sensor-based blocking commutation method, which realizes very high acceleration in a short time period. Sensor-less FOC (field-oriented control) algorithms do not require a Hall sensor and therefore are less expensive and have fewer components prone to failure. However, the acceleration performance at zero and low speeds for sensor-less FOC is not as good as the Hall sensor-based blocking commutation method and therefore requires more motor rotation cycles to reach high speed. Existing sensor-less FOC algorithms fail to address this issue, yielding a stall torque performance lower than that provided by the Hall sensor-based blocking commutation method.

In both the Hall sensor-based blocking commutation method and sensor-less FOC, the stall torque peak value is affected by the number of free rotation cycles of the power tool motor after the tool trigger is pressed but before the shaft rotation reaches the stall position (lower stall torque for fewer free rotation cycles), making consistent stall torque performance difficult to achieve. Furthermore, braking the motor limits the number of rotation cycles for the next round which makes the stall torque value in the next round much smaller.

Thus, there is a need for a motor control algorithm with improved stall torque performance.

SUMMARY

According to an embodiment of a method of controlling a motor of a power tool, the method comprises: driving the motor such that the motor rotates in a first direction; in response to the power tool entering a stall condition, operating the motor in a first stall state for a predetermined duration or a predetermined number of motor rotation cycles, wherein in the first stall state either the motor is driven such that the motor rotates in a second direction opposite the first direction or the motor is allowed to reverse direction and freely rotate in the second direction without excitation via a gear box coupled to the motor; and upon expiration of the predetermined duration or the predetermined number of motor rotation cycles, operating the motor in a second stall state which includes braking the motor.

According to an embodiment of electronic circuitry for a motor of a power tool, the electronic circuitry comprises: a controller configured to generate drive signals for driving the motor; and a converter configured to drive the motor based on the drive signals from the controller, such that the motor rotates in a first direction, wherein in response to the power tool entering a stall condition, the controller is configured to operate the motor in a first stall state for a predetermined duration or a predetermined number of motor rotation cycles, wherein in the first stall state either the motor is driven such that the motor rotates in a second direction opposite the first direction or the motor is allowed to reverse direction and freely rotate in the second direction without excitation via a gear box coupled to the motor, wherein upon expiration of the predetermined duration or the predetermined number of motor rotation cycles, the controller is configured to operate the motor in a second stall state which includes braking the motor.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

The embodiments described herein provide a method, controller, and electronic circuitry with improved stall torque performance for power tool applications such as power drills. In response to the power tool entering a stall condition, the motor of the power tool is operated in a first stall state for a predetermined duration or a predetermined number of motor rotation cycles. In the first stall state, either the motor is driven such that the motor rotates in a second direction opposite the first direction or the motor is allowed to reverse direction and freely rotate in the second direction without excitation via a gear box coupled to the motor. Upon expiration of the predetermined duration or the predetermined number of motor rotation cycles, the motor is operated in a second stall state which includes braking the motor. The stall mitigation technique described herein allows the motor to bounce reversely in the opposite direction for a predetermined time period or number of motor rotation cycles before motor braking is applied, which ensures the motor stops at a favorable position for the next use cycle with optimal stall torque performance.

Described next, with reference to the figures, are exemplary embodiments of the motor control method, controller, and electronic circuitry.

Figure 1:
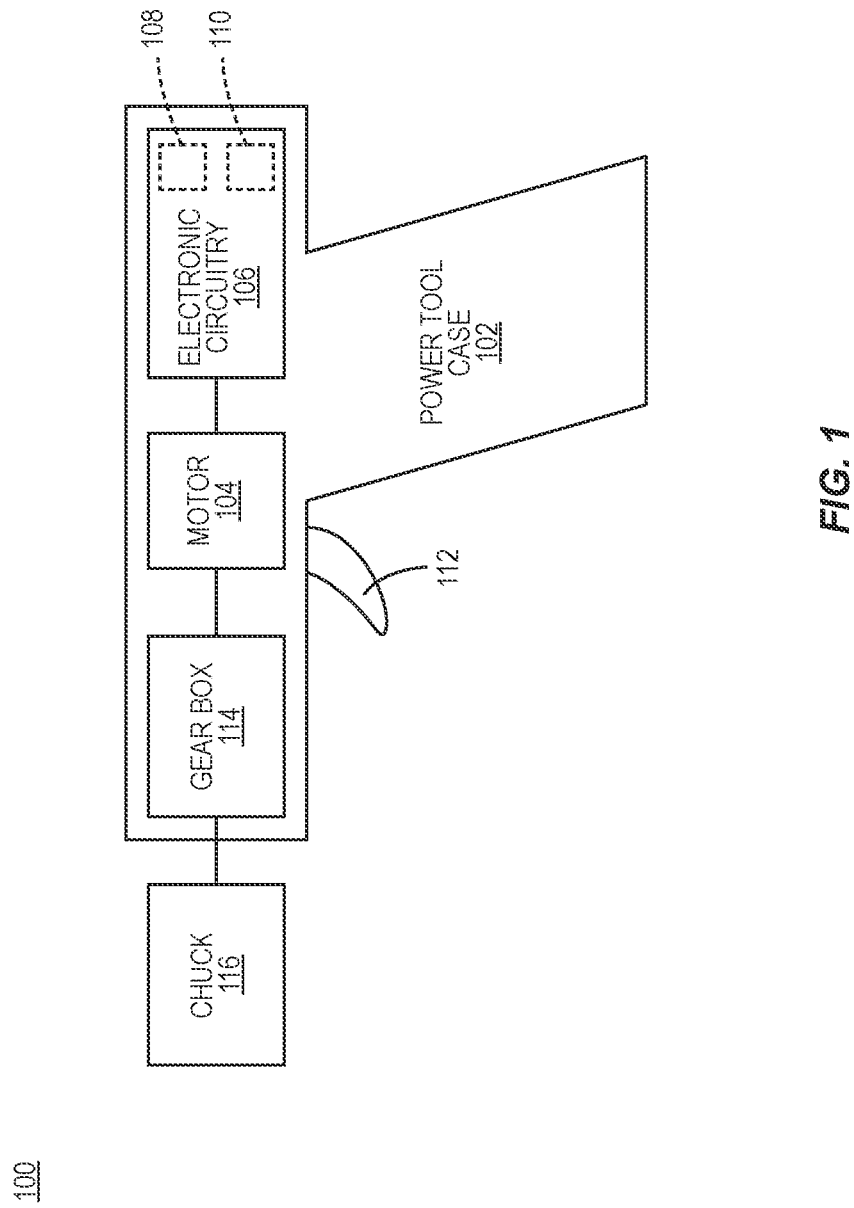
FIG. 1 illustrates a block diagram of a power tool.

FIG. 1 illustrates a block diagram of a power tool 100. In FIG. 1, the power tool 100 is illustrated as an electric drill. The power tool 100 includes a case 102 such as a plastic housing that contains a motor 104 and electronic circuitry 106 for the motor 104. The electronic circuitry 106 includes a controller 108 and a converter 110 such as a multi-phase motor H-bridge and related driver circuitry. The controller 108 is configured to generate drive signals for driving the motor 104, e.g., in response to user actuation at a trigger 112. The converter 110 is configured to drive the motor 104 based on the drive signals from the controller 108, such that the motor 104 rotates.

In one embodiment, a rotor angle of the motor 104 is not measured by the electronic circuitry 106 and the controller 108 is configured to drive the motor 104 using an FOC (field-oriented control) algorithm. FOC is a technique used to generate a multi-phase sinusoidal modulation which can be controlled in frequency and amplitude. The controller 108 uses calculations to transform the multi-phase signals into two phases that are easier to control and implement. Sensor-less FOC eliminates the position sensors and instead measures back electromotive force (EMF) and/or the stator currents to determine rotor position.

In another embodiment, the rotor angle of the motor 104 is measured by the electronic circuitry 106 and the controller 108 is configured to drive the motor 104 using a sensor-based block commutation algorithm. For example, the controller 108 may implement a Hall sensor-based blocking commutation method such as trapezoidal or sinusoidal commutation for a BLDC (brushless DC) motor 104.

In each case, the motor 104 may enter a stall condition in which the torque load causes the output rotational speed of the power tool 100 to become zero. When a stall condition occurs, the stall mitigation technique implemented by the controller 108 ensures that the motor 104 stops at a favorable position for the next use cycle with optimal stall torque performance.

Figure 2:
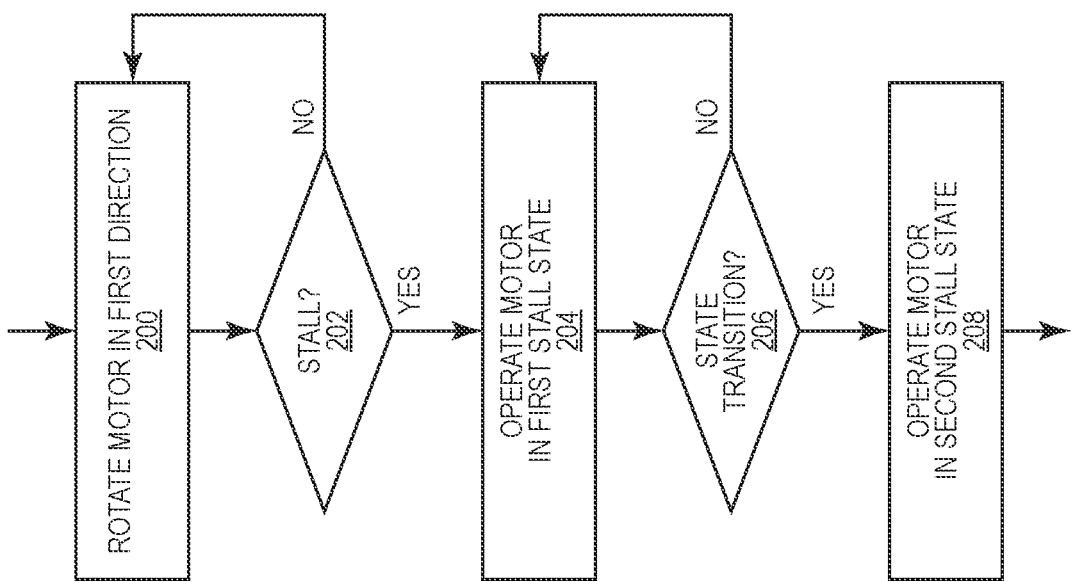
FIG. 2 illustrates an embodiment of a stall mitigation technique implemented by a controller of the power tool.

FIG. 2 illustrates an embodiment of the stall mitigation technique implemented by the controller 108. Before a stall condition is detected, the controller 108 drives the motor 104 such that the motor 104 rotates in a first (forward or reverse) direction (Block 200). In response to the power tool 100 entering a stall condition (Block 202), the controller 108 operates the motor 104 in a first stall state for a predetermined duration or a predetermined number of motor rotation cycles (Block 204).

In the first stall state, either the motor 104 is driven such that the motor 104 rotates in a second direction opposite the first direction or the motor 104 is allowed to reverse direction and freely rotate in the second direction without excitation via a gear box 114 coupled to the motor 104. In the case of an electric drill as the power tool 100, the opposite end of the gear box 114 is connected to a chuck 116 configured to receive one or more tools or implements such as a drill bit, as shown in FIG. 1. The gear box 114 is configured to disengage the motor 104 from the chuck 116 (or other type of shaft or shaft-like structure) of the power tool 100 in the first stall state. For example, the gear box 114 may include a planetary gear which provides space to move freely before the gear can be engaged and allows bouncing back of the motor 104.

Upon expiration of the predetermined duration or the predetermined number of motor rotation cycles (Block 206), the controller 108 operates the motor 104 in a second stall state which includes braking the motor 104 (Block 208). The motor 104 can be braked, e.g., by shorting the motor windings, or by applying active braking voltages, which are not visible in FIG. 1.

Figure 3:
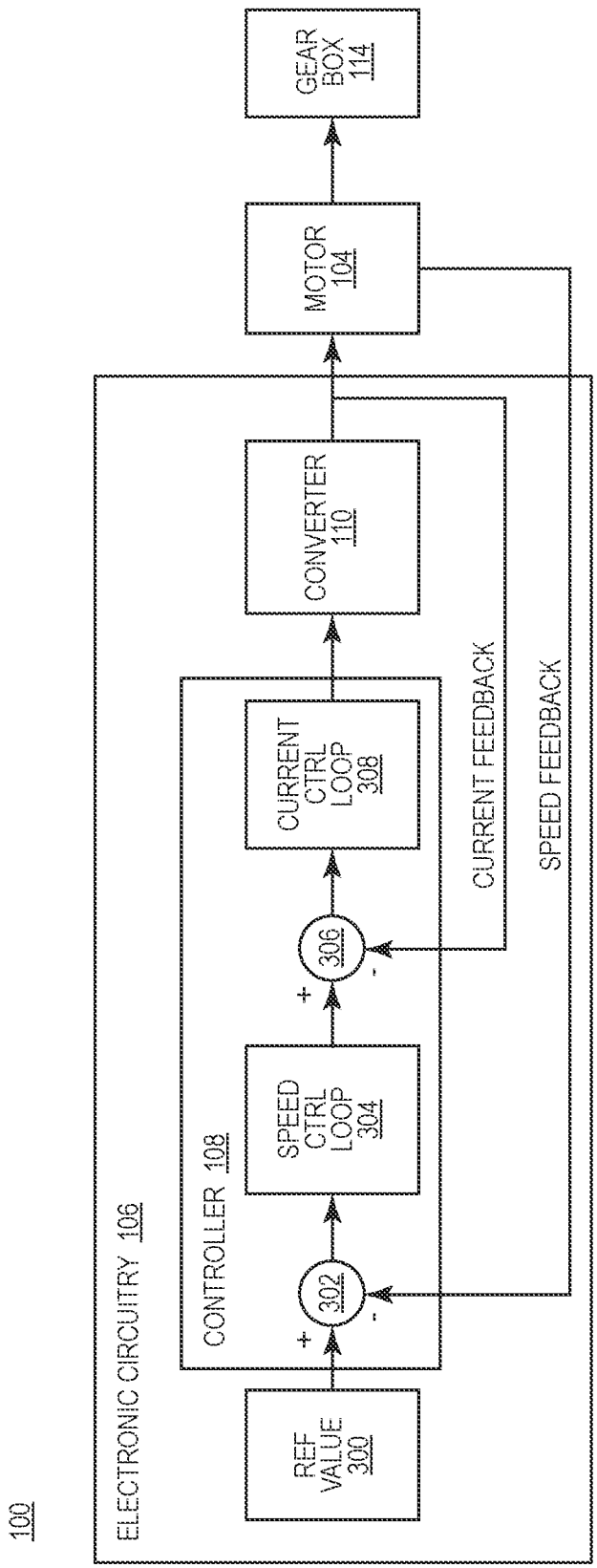
FIG. 3 illustrates a schematic diagram of the power tool.

FIG. 3 illustrates a schematic diagram of the power tool 100. The controller 108 is configured to control the speed of the motor 104 based on a reference value 300 derived based on user actuation at the trigger 112. A first error signal generation circuit 302 generates a first error signal based on the difference between the reference value 300 and the speed of the motor 104. A speed control loop 304 of the controller 108 generates a speed adjustment signal based on the first error signal. A second error signal generation circuit 306 generates a second error signal based on the difference between the speed adjustment signal generated by the speed control loop 304 and the current of the converter 110.

A current control loop 308 of the controller 108 generates a converter control signal based on the second error signal, for controlling the converter 110. For example, the current control loop 308 may adjust a pulse width of a PWM (pulse width modulation) signal input to the converter 110 based on the output of the current control loop 308. In the case of a brushless DC motor 104, the converter 110 electronically commutates the motor 104 based on the converter control signal output by the current control loop 308.

In the case of FOC, the controller 108 transforms the stator currents from a stationary reference frame to a rotor flux reference frame also known as the d-q reference frame. In FOC torque control mode, the controller 108 follows a reference torque value. In FOC speed control mode, the controller 108 follows a reference speed value and generates a torque reference for torque control. In a second (Vg) control mode, only current of the d-axis is controlled and the controller 108 generates a Vd adjustment voltage, where voltage Vq is presented by pressing of the trigger 112. FOC speed control mode utilizes real time feedback of the stator currents and rotor position which can be measured using sensors (not shown).

In the case of sensor-less FOC, the controller 108 uses estimated feedback values instead of actual sensor-based measurements. For example, the controller 108 may implement sensor-less FOC by taking current measurements from a shunt resistance and calculating each phase of the motor 104 based on the measurements. The controller 108 may include software or firmware for implementing a Clark transform that converts three-phases to two-phases, a Park transform that converts a rotating magnetic field into a fixed field, a cartesian transformation for angle position, a flux estimator to estimate the flux and rotor position, a PLL (phase-locked loop) to estimate and smooth the angle position, and one or more PI (proportional-integral) controllers to control velocity and the fixed currents, a polar transformation for angle and amplitude to be input into to an SVM (space vector modulation) block, and the SVM block to modulate a space vector in complex space into physical outputs for controlling the motor 104.

The controller 108 may also estimate when a stall condition occurs based on the estimated feedback values, without using a Hall sensor. The estimation may take some time, typically milli-seconds. In response to detecting a stall condition, the controller 108 implements the stall mitigation technique of FIG. 2.

Figure 4:
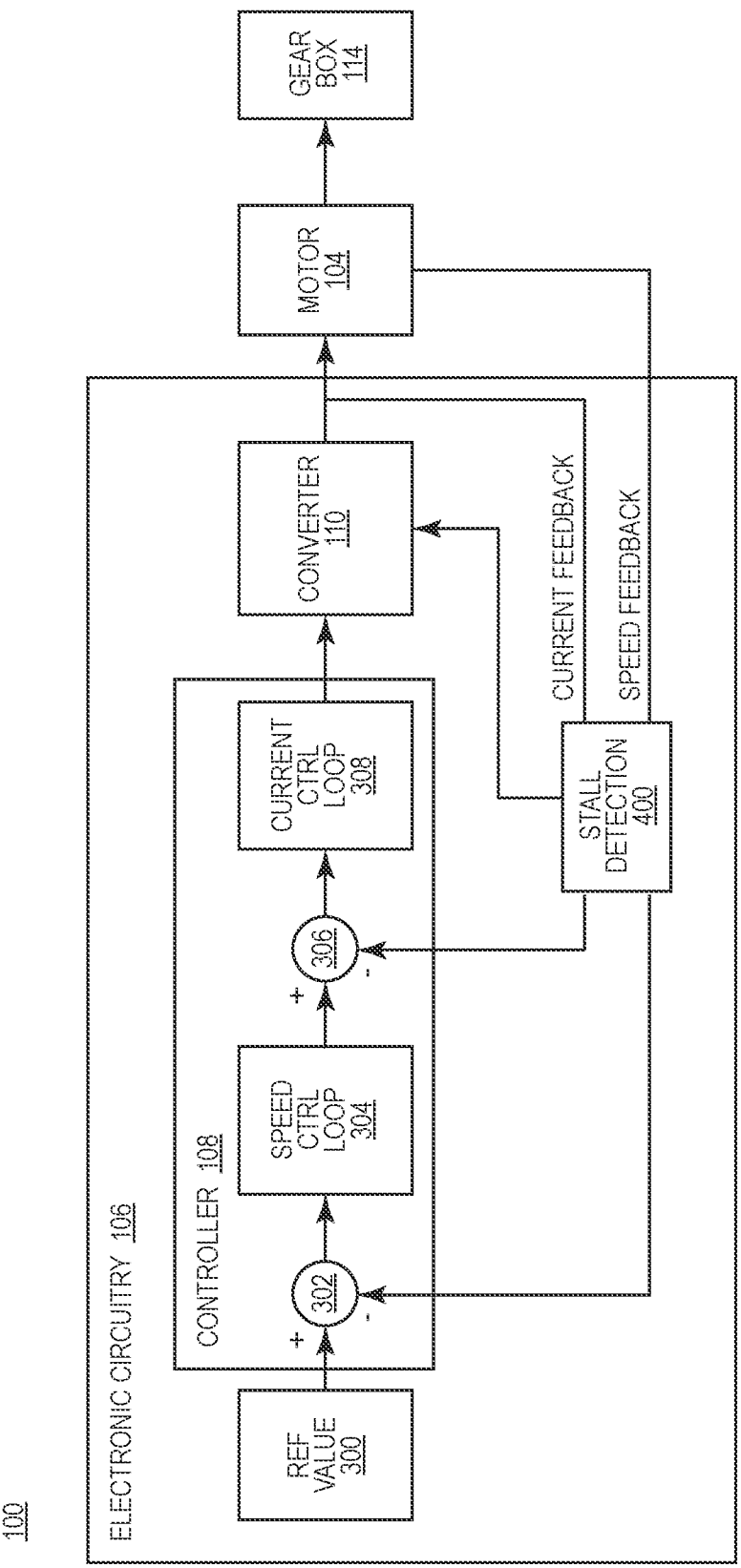
FIG. 4 illustrates a schematic diagram of the power tool, according to another embodiment.

FIG. 4 illustrates a schematic diagram of the power tool 100, according to another embodiment. The embodiment illustrated in FIG. 3 is similar to the embodiment illustrated in FIG. 2. However, in FIG. 3, the electronic circuitry 106 of the power tool 100 also includes a stall detection circuit 400 configured to detect a stall condition based on the measured or estimated current and speed feedback values. For example, the detection circuit 400 may include a Hall sensor that provides periodic pulses when the motor 104 is rotating. The Hall sensor signal pattern changes or a certain pattern lasts longer than normal operation when the motor 104 stalls. The controller 108 may use the Hall sensor response to detect the motor stall condition and implement the stall mitigation technique of FIG. 2.

Figure 5:
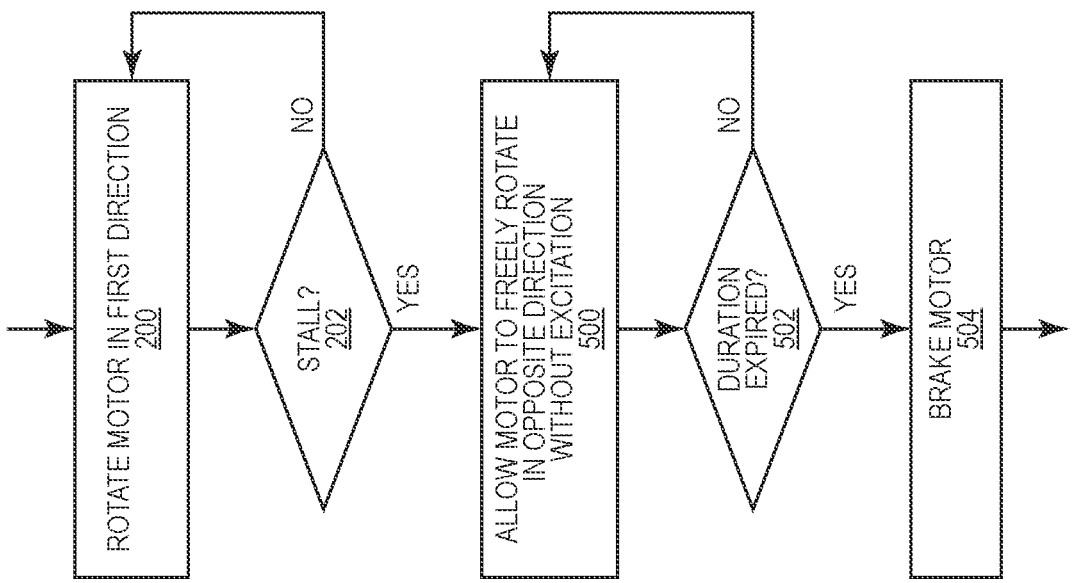
FIGS. 5 through 8 illustrate additional embodiments of the stall mitigation technique implemented by the power tool controller.

FIG. 5 illustrates the stall mitigation technique, according to another embodiment. In FIG. 5, the controller 108 operates the motor 104 in the first stall state by allowing the motor to reverse direction and freely rotate in the second (opposite) direction without excitation via the gear box 114 for a predetermined duration (Blocks 500 and 502). Accordingly, the motor 104 is allowed to bounce back freely (not controlled) for a predetermined (controlled) duration.

Upon expiration of the predetermined duration (Block 502), the controller 108 operates the motor 104 in the second stall state by braking the motor 104 (Block 504). As explained above, the controller 108 may brake the motor 104 by shorting the motor windings via the converter 110. By controlling the motor 104 in this manner when a stall condition is detected, the number of free rotation cycles before the motor 104 comes to a complete stop is well controlled by appropriate selection of the predetermined duration, which allows the motor 104 to stop at a position that is favorable for the next stall test condition and ensures a consistent and high stall torque every time. In one embodiment, the predetermined duration is selected such that the second stall state terminates before the motor 104 reverses direction from the second (opposite) direction to the first (starting) direction without excitation via the gear box 114.

Figure 6:
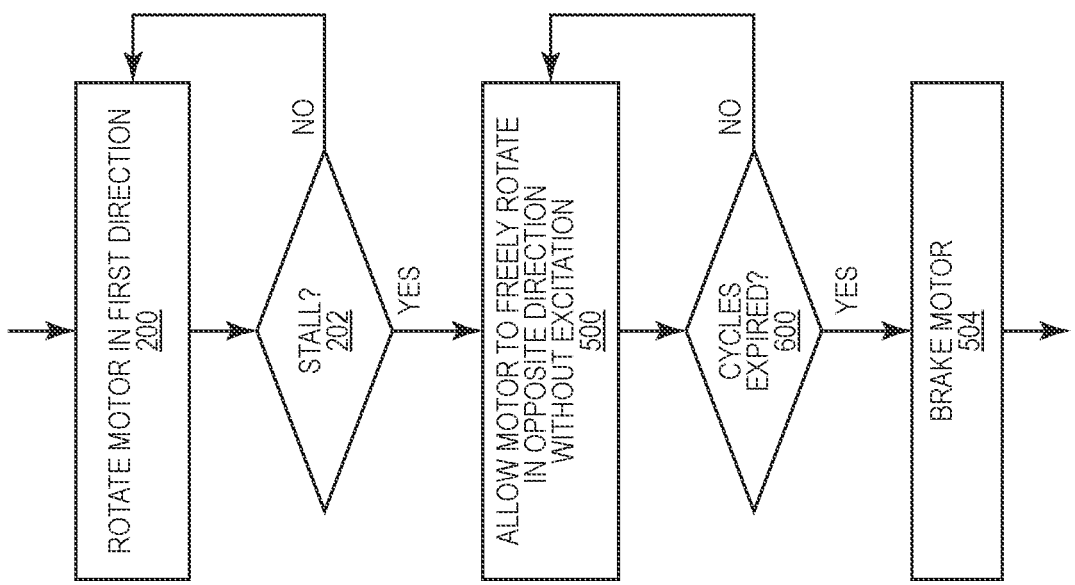

FIG. 6 illustrates the stall mitigation technique, according to another embodiment. The embodiment illustrated in FIG. 6 is similar to the embodiment illustrated in FIG. 5. However, in FIG. 6, the controller 108 operates the motor 104 in the first stall state by allowing the motor 104 to reverse direction and freely rotate in the second (opposite) direction without excitation via the gear box 114 for a predetermined number of motor rotation cycles instead of a predetermined duration (Blocks 500 and 600). Accordingly, the motor 104 is allowed to bounce back freely (not controlled) for a predetermined (controlled) number of motor rotation cycles.

Upon expiration of the predetermined number of motor rotation cycles (Block 600), the controller 108 operates the motor 104 in the second stall state by braking the motor 104 (Block 504), e.g., by shorting the motor windings via the converter 110. By controlling the motor 104 in this manner when a stall condition is detected, the number of free rotation cycles before the motor 104 comes to a complete stop is fixed, which allows the motor 104 to stop at a position that is favorable for the next stall test condition and ensures a consistent and high stall torque every time. In one embodiment, the predetermined number of motor rotation cycles is selected such that the second stall state terminates before the motor 104 reverses direction from the second (opposite) direction to the first (starting) direction without excitation via the gear box 114.

Figure 7:
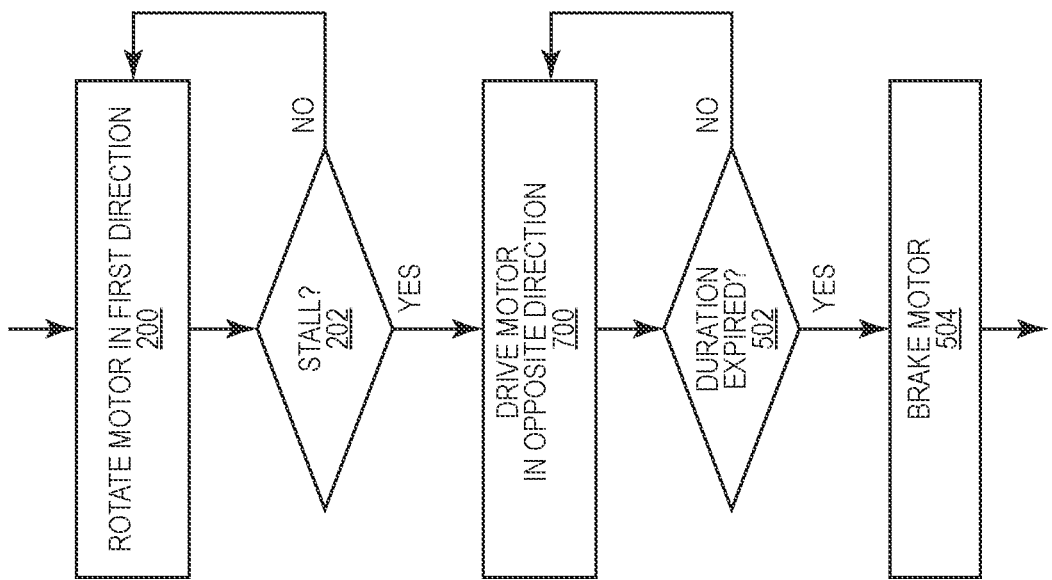

FIG. 7 illustrates the stall mitigation technique, according to another embodiment. The embodiment illustrated in FIG. 7 is similar to the embodiment illustrated in FIG. 5. However, in FIG. 7, the controller 108 operates the motor 104 in the first stall state by driving the motor 104 such that the motor 104 rotates in the second (opposite) direction for the predetermined duration (Blocks 700 and 502). Different than the embodiment illustrated in FIG. 5, the embodiment illustrated in FIG. 7 involves the controller 108 actively driving (exciting) the motor 104 in the second (opposite) direction in the first stall state. Upon expiration of the predetermined duration (Block 502), the controller 108 operates the motor 104 in the second stall state by braking the motor 104 (Block 504), e.g., by shorting the motor windings via the converter 110.

Figure 8:
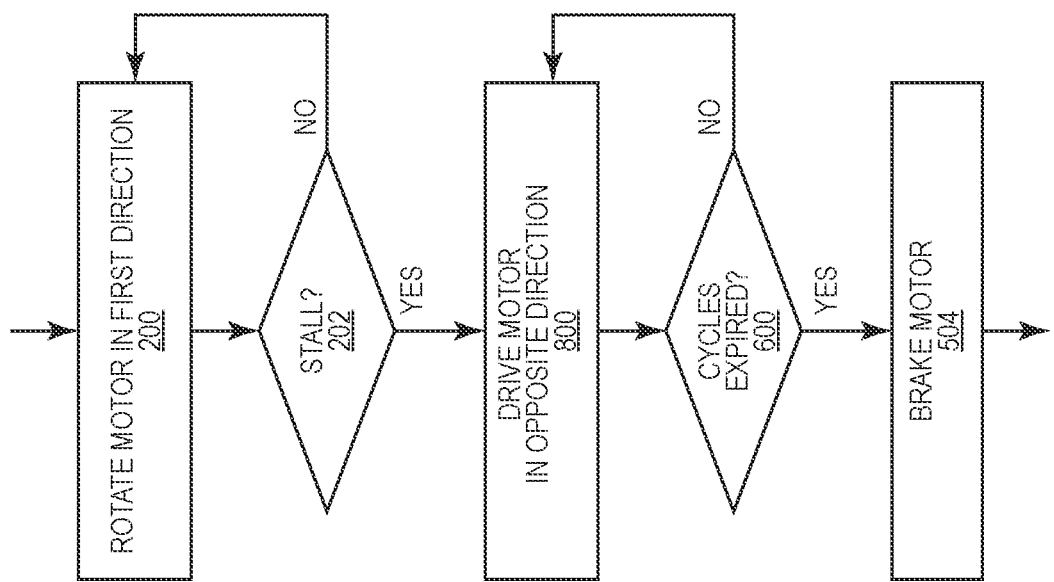

FIG. 8 illustrates the stall mitigation technique, according to another embodiment. The embodiment illustrated in FIG. 8 is similar to the embodiment illustrated in FIG. 6. However, in FIG. 8, the controller 108 operates the motor 104 in the first stall state by driving (exciting) the motor 104 such that the motor 104 rotates in the second (opposite) direction for the predetermined number of motor rotation cycles (Blocks 800 and 600). Upon expiration of the predetermined number of motor rotation cycles (Block 600), the controller 108 operates the motor 104 in the second stall state by braking the motor 104 (Block 504), e.g., by shorting the motor windings via the converter 110.

The criteria (predetermined duration or number of motor rotation cycles) for transitioning from the first stall state to the second stall state is important for achieving optimal and consistent stall torque performance during testing of the power tool 100. If the predetermined duration or number of motor rotation cycles is too long, the motor 102 will reach another extreme and then bounce forward again since the gear box 114 has defined limits, which reduces the number of cycles and therefore peak torque for the next round of testing. If the predetermined duration or number of motor rotation cycles is too short, the motor speed remains high which requires a longer braking period.

To avoid these issues, the criteria (predetermined duration or number of motor rotation cycles) for transitioning from the first stall state to the second stall state may be selected based on a peak stall torque specification. Separately or in combination, the transition criteria (predetermined duration or number of motor rotation cycles) may be selected based on the type or model of power tool 100. For example, the transition criteria (predetermined duration or number of motor rotation cycles) may account for motor inertia, gear box design, etc. Separately or in combination, the transition criteria (predetermined duration or number of motor rotation cycles) may be selected based on trial and error during the tool development and characterization process.

Figure 9:
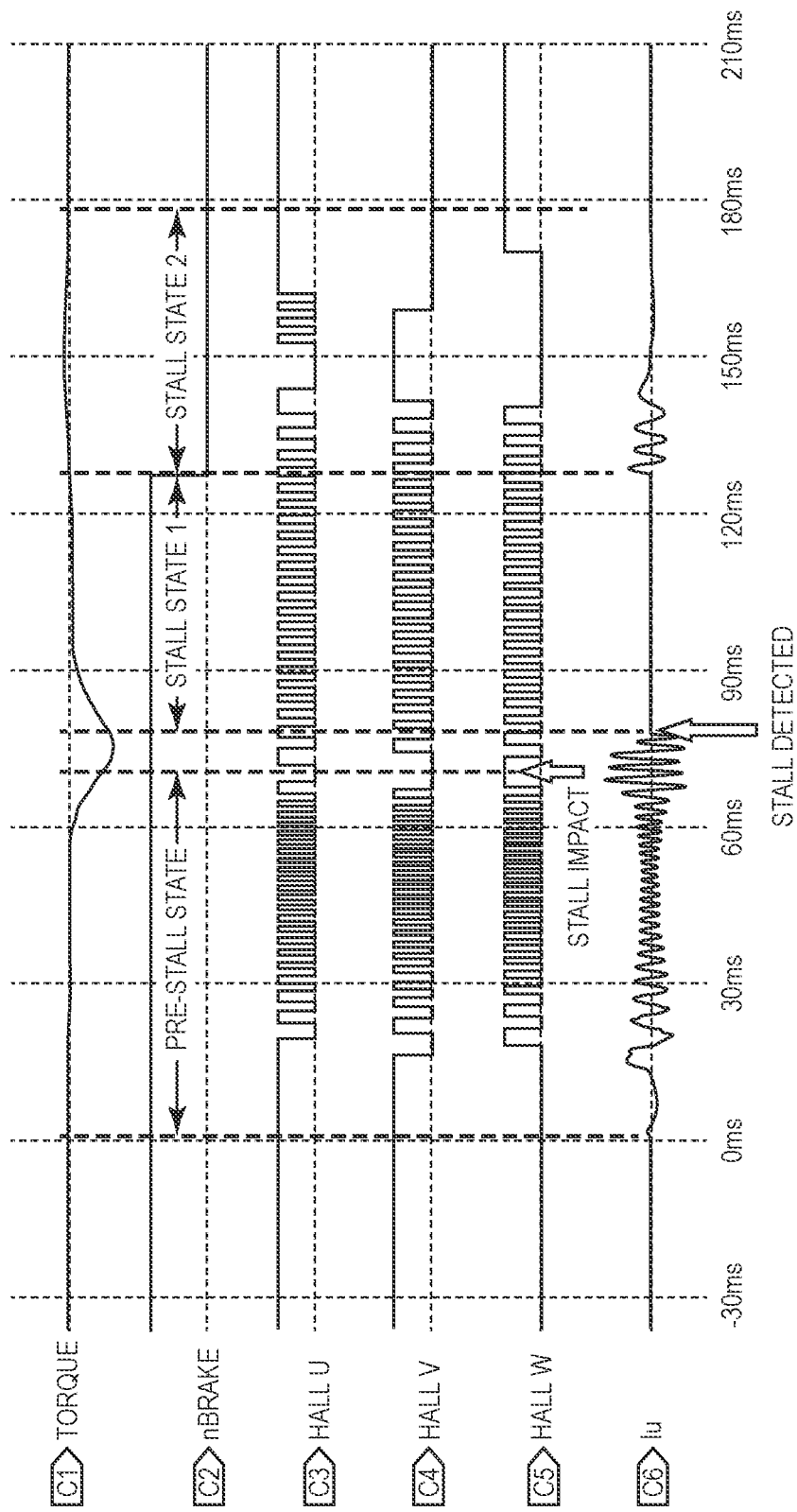
FIG. 9 illustrates simulation results for the stall mitigation technique described herein.

FIG. 9 illustrates simulation results for the stall mitigation technique described herein. Plotted in FIG. 9 are the motor torque ('C1'), a motor braking signal ('C2'), a Hall sensor reading for each motor phase ('C3', 'C4', and 'C5'), and the phase U current ('C6'). The Hall sensors are included in the test verification system and may or may not be included in the power tool 100, depending on whether sensor-less FOC is the control algorithm employed by the controller 108.

As shown in FIG. 9, the motor rotates prior to the occurrence of a stall condition ('STALL IMPACT'). This mode of operation is labelled 'PRE-STALL STATE' in FIG. 9. There is a slight delay before the controller 108 detects the stall condition and takes a corresponding action, as indicated by the distance between the vertical dashed lines labelled 'STALL IMPACT' and 'STALL DETECTED' in FIG. 9. In response to the power tool 100 entering the stall condition, the controller 108 operates the motor 104 in the first stall state ('STALL STATE 1') for a predetermined duration or a predetermined number of motor rotation cycles. Depending on the control algorithm embodiment employed (FIGS. 5 through 8), the controller 108 drives the motor 104 in the first stall state such that the motor 104 rotates in a second direction opposite the direction in the pre-stall state or the controller 108 allows the motor 104 to reverse direction and freely rotate in the second (opposite) direction without excitation via the gear box 114. Upon expiration of the predetermined duration or the predetermined number of motor rotation cycles, the controller 108 operates the motor 104 in the second stall state ('STALL STATE 2') which includes braking the motor 104.

Figure 10:
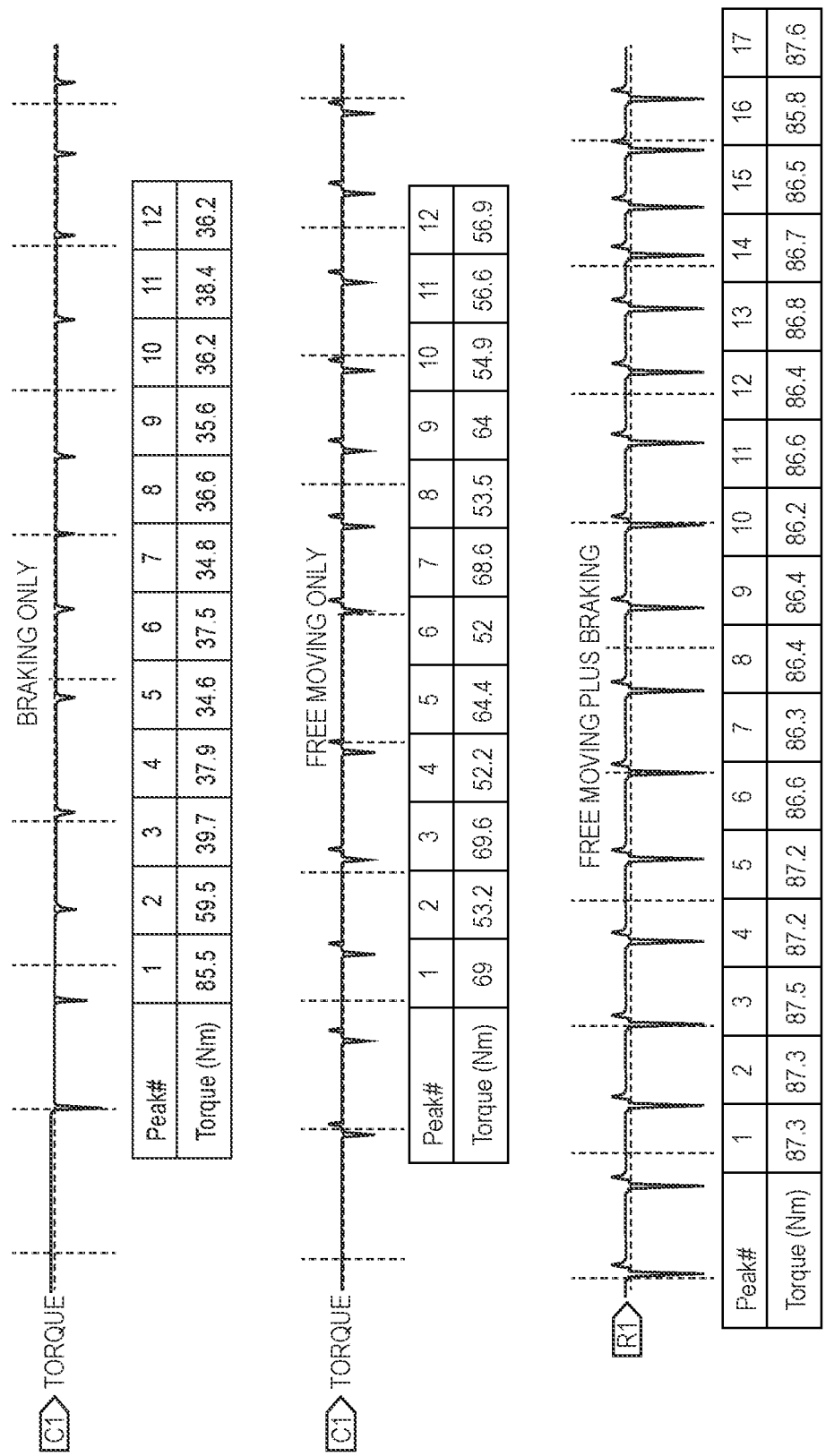
FIG. 10 compares stall torque measurements for the stall mitigation technique described herein to other stall mitigation techniques.

FIG. 10 compares stall torque measurements for the stall mitigation technique described herein to other stall mitigation techniques. The stall mitigation technique described herein includes a first stall state ('STALL STATE 1' in FIG.

9) in which the motor 104 is allowed to bounce reversely for a predetermined duration or number of motor rotation cycles followed by a second stall state ('STALL STATE 2' in FIG. 9) during which the motor 104 is braked.

The lowermost table ('FREE MOVING PLUS BRAKING') of peak torque measurements in FIG. 9 is for the stall mitigation technique described herein. The uppermost table ('BRAKING ONLY') of peak torque measurements in FIG. 9 is for a stall mitigation technique where only motor braking (no free motor movement) is applied in response to a stall condition. The middle table ('FREE MOVING ONLY') of peak torque measurements in FIG. 9 is for a stall mitigation technique where only free motor movement (no braking) is permitted in response to a stall condition.

As shown in the lowermost table of peak torque measurements, the stall mitigation technique described herein ensures a stable and high stall torque every time and allows the motor 104 to stop at a position that is favorable for the next stall test condition. In the lowermost table (free moving plus braking), the stall torque ranges from 86.2 Nm to 87.6 Nm between one (1) and twelve (12) free motor rotation cycles ('Peak #') before motor stall. The other two tables of peak torque measurements show significant stall torque variation.

In the uppermost table (braking only), the stall torque ranges from 34.6 Nm to 85.5 Nm between one (1) and twelve (12) free motor rotation cycles before motor stall. In the middle table (free moving only), the stall torque ranges from 52 Nm to 69 Nm between one (1) and twelve (12) free motor rotation cycles before motor stall. In both the braking only case and the free moving only case, the stall torque peak values are strongly influenced by the number of free rotation cycles the power tool motor 104 achieves after the trigger 112 is pressed but before the tool chuck/shaft 116 hits the stall position, yielding a stall torque that varies widely as a function of free motor rotation cycles. This means that the number of free motor rotation cycles for the next round of peak stall torque testing will be limited in both the braking only case and the free moving only case, making the stall torque value in the next round much smaller.

This is not the case with the stall mitigation technique described herein which yields a consistent and high stall torque every time. More free rotation cycles results in higher motor speed which yields a higher impact when the motor 104 stalls and therefore higher stall torque. By controlling where the motor 104 stops during the last stall, then the next instance of stall testing yields a high stall torque peak value in a consistent and stable manner.

Although the present disclosure is not so limited, the following numbered examples demonstrate one or more aspects of the disclosure.

Example 1. A method of controlling a motor of a power tool, the method comprising: driving the motor such that the motor rotates in a first direction; in response to the power tool entering a stall condition, operating the motor in a first stall state for a predetermined duration or a predetermined number of motor rotation cycles, wherein in the first stall state either the motor is driven such that the motor rotates in a second direction opposite the first direction or the motor is allowed to reverse direction and freely rotate in the second direction without excitation via a gear box coupled to the motor; and upon expiration of the predetermined duration or the predetermined number of motor rotation cycles, operating the motor in a second stall state which includes braking the motor.

Example 2. The method of example 1, wherein operating the motor in the first stall state comprises: allowing the motor to reverse direction and freely rotate in the second direction without excitation via the gear box for the predetermined duration.

Example 3. The method of example 2, wherein operating the motor in the second stall state comprises: braking the motor upon expiration of the predetermined duration.

Example 4. The method of example 2 or 3, wherein the predetermined duration is selected such that the first stall state terminates before the motor reverses direction from the second direction to the first direction without excitation via the gear box.

Example 5. The method of example 1, wherein operating the motor in the first stall state comprises: allowing the motor to reverse direction and freely rotate in the second direction without excitation via the gear box for the predetermined number of motor rotation cycles.

Example 6. The method of example 5, wherein operating the motor in the second stall state comprises: braking the motor upon expiration of the predetermined number of motor rotation cycles.

Example 7. The method of example 5 or 6, wherein the predetermined number of motor rotation cycles is selected such that the second stall state terminates before the motor reverses direction from the second direction to the first direction without excitation via the gear box.

Example 8. The method of example 1, wherein operating the motor in the first stall state comprises: driving the motor such that the motor rotates in the second direction for the predetermined duration.

Example 9. The method of example 8, wherein operating the motor in the second stall state comprises: braking the motor upon expiration of the predetermined duration.

Example 10. The method of example 1, wherein operating the motor in the first stall state comprises: driving the motor such that the motor rotates in the second direction for the predetermined number of motor rotation cycles.

Example 11. The method of example 10, wherein operating the motor in the second stall state comprises: braking the motor upon expiration of the predetermined number of motor rotation cycles.

Example 12. The method of any of examples 1 through 11, wherein a rotor angle of the motor is not measured and the motor is driven using a sensor-less FOC (field-oriented control) algorithm.

Example 13. The method of any of examples 1 through 11, wherein a rotor angle of the motor is measured and the motor is driven using a sensor-based block commutation algorithm.

Example 14. Electronic circuitry for a motor of a power tool, the electronic circuitry comprising: a controller configured to generate drive signals for driving the motor; and a converter configured to drive the motor based on the drive signals from the controller, such that the motor rotates in a first direction, wherein in response to the power tool entering a stall condition, the controller is configured to operate the motor in a first stall state for a predetermined duration or a predetermined number of motor rotation cycles, wherein in the first stall state either the motor is driven such that the motor rotates in a second direction opposite the first direction or the motor is allowed to reverse direction and freely rotate in the second direction without excitation via a gear box coupled to the motor, wherein upon expiration of the predetermined duration or the predetermined number of motor rotation cycles, the controller is configured to operate the motor in a second stall state which includes braking the motor.

Example 15. The electronic circuitry of example 14, wherein the controller is configured to operate the motor in the first stall state by allowing the motor to reverse direction and freely rotate in the second direction without excitation via the gear box for the predetermined duration.

Example 16. The electronic circuitry of example 15, wherein the controller is configured to operate the motor in the second stall state by braking the motor upon expiration of the predetermined duration.

Example 17. The electronic circuitry of example 14, wherein the controller is configured to operate the motor in the first stall state by allowing the motor to reverse direction and freely rotate in the second direction without excitation via the gear box for the predetermined number of motor rotation cycles.

Example 18. The electronic circuitry of example 17, wherein the controller is configured to operate the motor in the second stall state by braking the motor upon expiration of the predetermined number of motor rotation cycles.

Example 19. The electronic circuitry of example 14, wherein the controller is configured to operate the motor in the first stall state by driving the motor such that the motor rotates in the second direction for the predetermined duration.

Example 20. The electronic circuitry of example 19, wherein the controller is configured to operate the motor in the second stall state by braking the motor upon expiration of the predetermined duration.

Example 21. The electronic circuitry of example 14, wherein the controller is configured to operate the motor in the first stall state by driving the motor such that the motor rotates in the second direction for the predetermined number of motor rotation cycles.

Example 22. The electronic circuitry of example 21, wherein the controller is configured to operate the motor in the second stall state by braking the motor upon expiration of the predetermined number of motor rotation cycles.

Example 23. The electronic circuitry of any of examples 14 through 22, wherein a rotor angle of the motor is not measured by the electronic circuitry and the controller is configured to drive the motor using a sensor-less FOC (field-oriented control) algorithm.

Example 24. The electronic circuitry of any of examples 14 through 22, wherein a rotor angle of the motor is measured by the electronic circuitry and the controller is configured to drive the motor using a sensor-based block commutation algorithm.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The expression "and/or" should be interpreted to include all possible conjunctive and disjunctive combinations, unless expressly noted otherwise. For example, the expression "A and/or B" should be interpreted to mean only A, only B, or both A and B. The expression "at least one of" should be interpreted in the same manner as "and/or", unless expressly noted otherwise. For example, the expression "at least one of A and B" should be interpreted to mean only A, only B, or both A and B.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of controlling a motor of a power tool, the method comprising:
    driving the motor such that the motor rotates in a first direction;
    in response to the power tool entering a stall condition, operating the motor in a first stall state for a predetermined duration or a predetermined number of motor rotation cycles, wherein in the first stall state either the motor is driven such that the motor rotates in a second direction opposite the first direction or the motor is allowed to reverse direction and freely rotate in the second direction without excitation via a gear box coupled to the motor; and
    upon expiration of the predetermined duration or the predetermined number of motor rotation cycles, operating the motor in a second stall state which includes braking the motor.

2. The method of claim 1, wherein operating the motor in the first stall state comprises:
    allowing the motor to reverse direction and freely rotate in the second direction without excitation via the gear box for the predetermined duration.

3. The method of claim 2, wherein operating the motor in the second stall state comprises:
    braking the motor upon expiration of the predetermined duration.

4. The method of claim 2, wherein the predetermined duration is selected such that the first stall state terminates before the motor reverses direction from the second direction to the first direction without excitation via the gear box.

5. The method of claim 1, wherein operating the motor in the first stall state comprises:
    allowing the motor to reverse direction and freely rotate in the second direction without excitation via the gear box for the predetermined number of motor rotation cycles.

6. The method of claim 5, wherein operating the motor in the second stall state comprises:
    braking the motor upon expiration of the predetermined number of motor rotation cycles.

7. The method of claim 5, wherein the predetermined number of motor rotation cycles is selected such that the second stall state terminates before the motor reverses direction from the second direction to the first direction without excitation via the gear box.

8. The method of claim 1, wherein operating the motor in the first stall state comprises:
    driving the motor such that the motor rotates in the second direction for the predetermined duration.

9. The method of claim 8, wherein operating the motor in the second stall state comprises:
    braking the motor upon expiration of the predetermined duration.

10. The method of claim 1, wherein operating the motor in the first stall state comprises:
    driving the motor such that the motor rotates in the second direction for the predetermined number of motor rotation cycles.

11. The method of claim 10, wherein operating the motor in the second stall state comprises:
    braking the motor upon expiration of the predetermined number of motor rotation cycles.

12. The method of claim 1, wherein a rotor angle of the motor is not measured and the motor is driven using a sensor-less FOC (field-oriented control) algorithm.

13. The method of claim 1, wherein a rotor angle of the motor is measured and the motor is driven using a sensor-based block commutation algorithm.

14. Electronic circuitry for a motor of a power tool, the electronic circuitry comprising:
    a controller configured to generate drive signals for driving the motor; and
    a converter configured to drive the motor based on the drive signals from the controller, such that the motor rotates in a first direction,
    wherein in response to the power tool entering a stall condition, the controller is configured to operate the motor in a first stall state for a predetermined duration or a predetermined number of motor rotation cycles, wherein in the first stall state either the motor is driven such that the motor rotates in a second direction opposite the first direction or the motor is allowed to reverse direction and freely rotate in the second direction without excitation via a gear box coupled to the motor,
    wherein upon expiration of the predetermined duration or the predetermined number of motor rotation cycles, the controller is configured to operate the motor in a second stall state which includes braking the motor.

15. The electronic circuitry of claim 14, wherein the controller is configured to operate the motor in the first stall state by allowing the motor to reverse direction and freely rotate in the second direction without excitation via the gear box for the predetermined duration.

16. The electronic circuitry of claim 15, wherein the controller is configured to operate the motor in the second stall state by braking the motor upon expiration of the predetermined duration.

17. The electronic circuitry of claim 14, wherein the controller is configured to operate the motor in the first stall state by allowing the motor to reverse direction and freely rotate in the second direction without excitation via the gear box for the predetermined number of motor rotation cycles.

18. The electronic circuitry of claim 17, wherein the controller is configured to operate the motor in the second stall state by braking the motor upon expiration of the predetermined number of motor rotation cycles.

19. The electronic circuitry of claim 14, wherein the controller is configured to operate the motor in the first stall state by driving the motor such that the motor rotates in the second direction for the predetermined duration.

20. The electronic circuitry of claim 19, wherein the controller is configured to operate the motor in the second stall state by braking the motor upon expiration of the predetermined duration.

21. The electronic circuitry of claim 14, wherein the controller is configured to operate the motor in the first stall state by driving the motor such that the motor rotates in the second direction for the predetermined number of motor rotation cycles.

22. The electronic circuitry of claim 21, wherein the controller is configured to operate the motor in the second stall state by braking the motor upon expiration of the predetermined number of motor rotation cycles.

23. The electronic circuitry of claim 14, wherein a rotor angle of the motor is not measured by the electronic circuitry and the controller is configured to drive the motor using a sensor-less FOC (field-oriented control) algorithm.

24. The electronic circuitry of claim 14, wherein a rotor angle of the motor is measured by the electronic circuitry and the controller is configured to drive the motor using a sensor-based block commutation algorithm.

* * * * *